(No Model.)
W. SAMS.
GAS GENERATOR.
No. 598,393.  Patented Feb. 1, 1898.
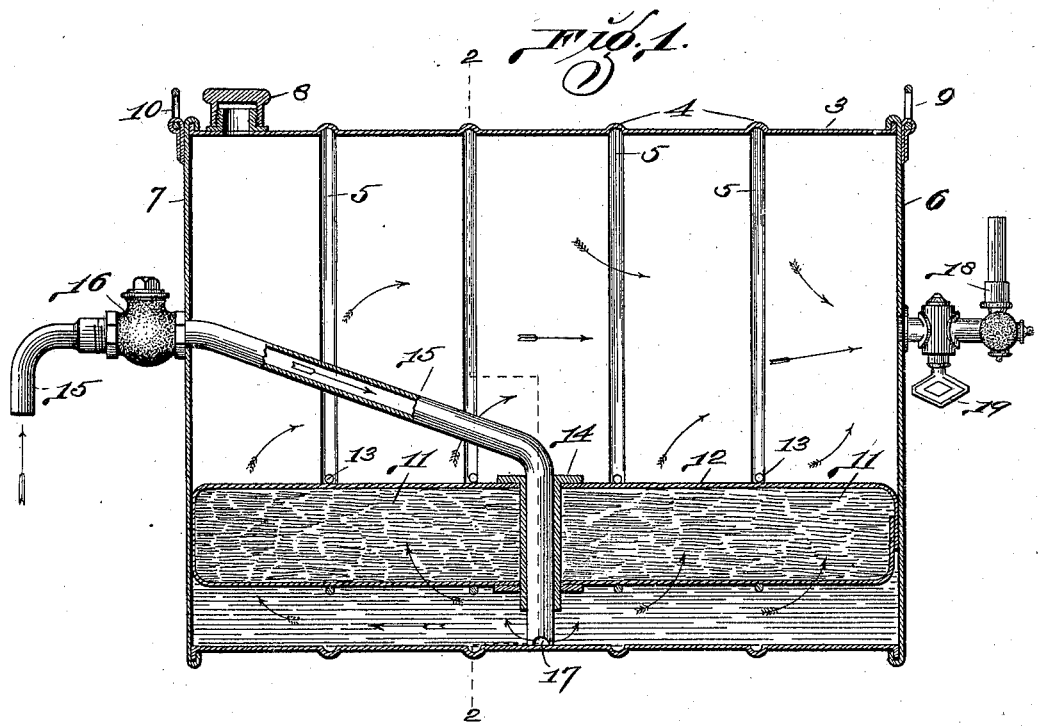
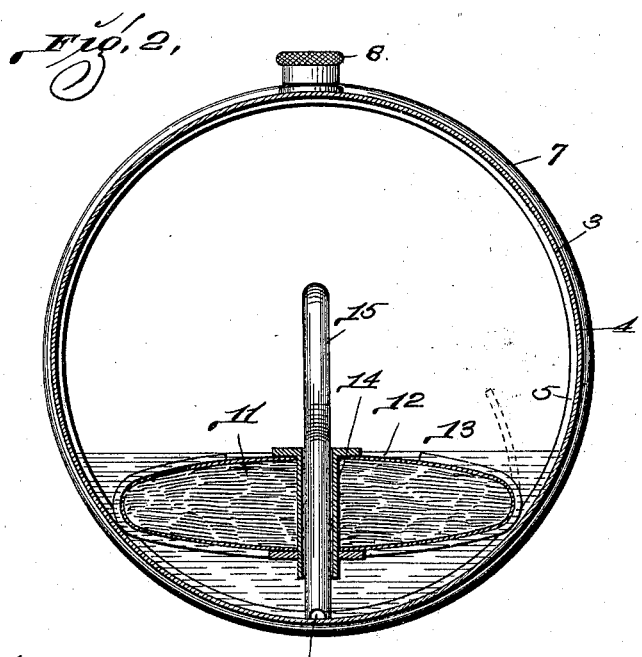
Attest:
N. F. Smith
S. G. Wells
Inventor:
Walter Sams
By Higdon, Longan & Higdon
Atty's.
THE NORRIS PETERS CO., PHOTO-LITHO., WASHINGTON, D. C.

UNITED STATES PATENT OFFICE.

WALTER SAMS, OF CLINTON, MISSOURI, ASSIGNOR TO WILLIAM E. SAMS AND FRANK B. WADELL, OF SAME PLACE.

GAS-GENERATOR.

SPECIFICATION forming part of Letters Patent No. 598,393, dated February 1, 1898.

Application filed May 24, 1897. Serial No. 637,899. (No model.)

*To all whom it may concern:*

Be it known that I, WALTER SAMS, of the city of Clinton, Henry county, State of Missouri, have invented certain new and useful Improvements in Gas-Generators, of which the following is a full, clear, and exact description, reference being had to the accompanying drawings, forming a part thereof.

My invention relates to gas-generators for blowpipes and the like; and it consists of the novel construction, combination, and arrangement of parts hereinafter shown, described, and claimed.

Figure 1 is a central sectional view of my improved gas-generator. Fig. 2 is a cross-section taken approximately on the line 2 2 of Fig. 1.

Referring by numerals to the drawings, 3 is a sheet-metal cylinder having the annular beads 4 formed in parallel positions a suitable distance apart, said beads being formed by pressing the sheet metal outwardly, thus producing internal annular grooves 5. The cylinder 3 is closed by the heads 6 and 7, thus forming the tank. The nipple 8 forms a means of inserting oil into the tank. The loops 9 and 10 are attached to the upper sides of the heads 6 and 7 and form means of hanging the tank in position under the work bench or table.

The porous material 11 is a body of felt or similar absorbent or porous substance inclosed in a sack 12 of cotton flannel. The clamps 13 are formed of wire and are arranged suitable distances apart and extend transversely around the material 11, and said clamps are flattened when seen in elevation, as in Fig. 2, and are designed to hold the porous substance 11 in the desired shape. The ends of the clamps 13 rest in the grooves 5. Thus is formed a porous horizontal wall located in the part of the tank fitting closely against the heads 6 and 7 and fitting closely against the sides formed by the cylinder 3. The collar 14 is inserted vertically through the center of the porous wall and the pipe 15 leads through the head 7 and downwardly through the collar 14, said pipe being securely fixed in said head. The check-valve 16 is placed in the pipe 15, outside of the head 7, and the lower end of the pipe within the tank is scalloped, as indicated by 17, as required to form passages from the interior of said pipe to the space below the porous wall. The pipe 18 is fixed in the head 6, as required to form an outlet-passage from the tank, and a cut-off valve 19 is inserted in the pipe 18. The bellows or blower is attached to the outer end of the pipe 15, and when operated the air passes through said pipe 15 to the space below the porous wall. The tank 3 is filled with suitable oil for producing gas, such as gasolene, to a point above the porous wall, and the air in passing through the pipe 15 is forced to pass through the oil and through the porous wall to the space above the porous wall, and then passes outwardly through the pipe 18 to the blowpipe or burner. In passing through the oil and the porous wall the air becomes saturated with oil and produces a gas and is conveyed to the blowpipe or burner through the pipe 18 as a mixture of air and gas.

I claim—

In a gas-generator for blowpipes and the like, the felt body 11, the cotton-flannel sack 12 inclosing said felt body, the clamps 13 formed of wire arranged suitable distances apart and extending transversely around said felt body, said clamps being flattened in elevation as required to hold the felt body flat, the sheet-metal cylinder 3 having the annular grooves 5 formed in parallel positions and suitable distances apart to receive the ends of said clamps 13, the heads 6 and 7 closing the ends of said cylinder after the felt body has been placed in position between said heads and with its ends engaging said heads, the collar 14 inserted vertically through the center of the felt body, the pipe 15 leading through the head 7 and downwardly through the collar 14, the check-valve 16 in said pipe 15 outside of said head 7, the scallops 17 in the lower inner end of said pipe 15, and the pipe 18 fixed in the head 6 and leading from the space above the felt body, substantially as specified.

In testimony whereof I affix my signature in presence of two witnesses.

WALTER SAMS.

Witnesses:
EDWARD E. LONGAN,
S. G. WELLS.